United States Patent [19]

Chirash et al.

[11] 3,709,825

[45] Jan. 9, 1973

[54] CLEANING COMPOSITION

[75] Inventors: William Chirash, New Providence; Barney Joseph Zmoda, Bridgewater Township, Sommerset County, both of N.J.

[73] Assignee: Colgate-Palmolive Company, New York, N.Y.

[22] Filed: Oct. 16, 1970

[21] Appl. No.: 81,564

Related U.S. Application Data

[63] Continuation of Ser. No. 680,944, Nov. 6, 1967, abandoned.

[52] U.S. Cl. ................252/158, 134/38, 134/40, 252/135, 252/170, 252/526, 252/531, 252/545

[51] Int. Cl. ................................................C11d 7/22

[58] Field of Search......252/135, 526, 137, 531, 158, 252/545, 152, 170; 134/38, 40

[56] References Cited

UNITED STATES PATENTS

3,151,084   9/1964   Schiltz et al. ..........................252/137
2,500,024   3/1950   Cornell et al. ..........................252/161
2,962,395   11/1960  Brown .....................................134/38

OTHER PUBLICATIONS

Emulsions, Carbide & Carbon, N.Y., N.Y., 7th ed. 1946, p. 66.

*Primary Examiner*—Mayer Weinblatt
*Attorney*—Norman Blumenkopf, Richard N. Miller, Murray M. Grill, Herbert S. Sylvester, Thomas J. Corum, Ronald S. Cornell, Robert L. Stone and Robert A. Burroughs

[57] ABSTRACT

A substantially single phase aqueous liquid composition comprising a detergent selected from the group consisting of anionic and nonionic detergents, a glycol ether, a nitrilo compound selected from the group consisting of nitrilotriacetic acid and alkali metal and ammonium nitrilotriacetates, and a salt selected from the group consisting of alkali metal and ammonium metal and ammonium borates, said composition in water having a pH of at least 8.5.

2 Claims, No Drawings

CLEANING COMPOSITION

This application is a continuation of Ser. No. 680,944, filed Nov. 6, 1967, now abandoned.

This invention relates to an all-purpose liquid cleaner and, more particularly, to a cleaning composition adapted for spot cleaning of soiled surfaces as well as for stripping wax or polish from floors.

All-purpose liquid cleaners are very much a part of today's detergent market especially because of their usefulness in cleaning surfaces such as floors and walls. The sine qua non for the all-purpose liquid cleaner is its ability to strip wax or polish from synthetic surfaces since floor wax is probably the most stubborn type of soil that this type of cleaning composition has to contend with. A capacity for high wax stripping performance is, therefore, a good indication of a meritorious all-purpose cleaner.

A typical modern floor polish is composed of three major ingredients: insoluble polymers, alkali soluble resins, and soft waxes. Each of these materials is held in solution or emulsion in the polish formulation by means of intrinsic carboxyl groups. The carboxyl groups may be either an integral part of one of these three major ingredients or part of the surfactant system used in suspending these ingredients in a stable emulsion. In the polish formulation the carboxyl groups are present in the form of their ammonium or amine carboxylates; on the floor the ammonia and amines volatilize leaving the water-insoluble carboxyl group in the polish film. Contact with alkaline solutions reconverts the insoluble carboxyl groups into soluble carboxylate ions. Therefore, a factor in polish removal is simple acid-base neutralization. In this respect, it has been hitherto believed that effective wax-stripping efficiency was most easily and economically achieved by controlling the alkalinity of the formulation to be used. Consequently, in order to provide more powerful formulations, manufactureres of all-purpose cleaners have recently increased the amount of phosphate component such as potassium pyrophosphate and the pH. Phosphate, however, is not only expensive, but, with regard to wax stripping performance, increases in concentration of phosphate reach a point of diminishing return.

There is a need, therefore, for an effective all-purpose cleaner which does not rely on phosphate content or unusually high pH levels for effective wax stripping performance. There is also a need for a composition which gives a superior wax stripping performance superior to those all-purpose cleaners presently available.

Consequently, it is an object of this invention to provide an all-purpose liquid cleaning composition with superior spot cleaning and wax stripping characteristics achieved without relying on a phosphate component.

Another object of this invention is to provide an all-purpose cleaner adapted for spot cleaning and wax stripping which does not rely on unusually high pH levels for effective performance.

Still another object is to provide a method for stripping wax or polish from synthetic surfaces.

In accordance with this invention an all-purpose cleaning composition adapted for spot cleaning and wax stripping has been found which depends for its excellent performance on the interrelationship of its components and the specific proportions thereof. The inventive formulation is a substantially single phase aqueous liquid composition consisting essentially of a detergent selected from the group consisting of anionic and non-ionic detergent, a glycol ether, a nitrilo compound selected from the group consisting of nitrilotriacetic acid and alkali metal and ammonium nitrilotriacetates (NTA), and a salt selected from the group consisting of alkali metal and ammonium borates, and, more particularly, an aqueous solution thereof having a pH of at least 8.5.

The proportions of the essential components are given in parts by weight and are as follows: detergent — about 0.1 to 5 parts and preferably about 0.3 to about 1 part; glycol ether — about 1 to 10 parts and preferably about 3 to about 7 parts; mixture of NTA and borate — about 1 to 15 parts and preferably about 2 to about 8 parts. The ratio of NTA to borate is, by weight, about 10:1 to about 1:5 and preferably about 3:1 to about 1:2 with the optimum being about 1:1.

It is surprising that the use of these components and adjustment of their proportions within the limits set forth eliminates the need for increasing the phosphate content and the pH level to achieve better performance. It is also surprising that within the limits set forth for this invention a superior performance is achieved to those of heretofore known compositions which have never before been in the form of a "four essential component" all-purpose cleaner. The combination in the specific proportions mentioned reveals a dramatic increase in performance characteristics when used for the stripping of wax from synthetic surfaces. Evidently, in addition to the results which would be expected from their natural alkalinity, certain materials by their own nature contribute a better performance when they are acting in a specific combination.

A more detailed description of the invention follows:

As noted above, the essential components of the inventive cleaning composition are anionic or nonionic detergents, a glycol ether, NTA, and alkali metal or ammonium borate.

The compositions are prepared by simply admixing the components with water in the specific proportions mentioned using conventional agitating apparatus.

Suitable anionic detergents are water-soluble and have a hydrophobic long chain substituent containing at least eight carbon atoms, generally eight to 26 carbon atoms and preferably 12 to 18 carbons, in their molecular structure and at least one water-solubilizing group selected from the group consisting of sulfate, sulfonate, and carboxylate so as to form a water-soluble detergent. The alkyl aryl sulfonates are preferably used as the anionic detergent, the linear alkyl type being preferred over the branched chain. Typical of this class of compounds are those in which the aryl nucleus is derived from benzene, toluene, xylene, phenol, cresol, and naphthalene and the alkyl substituents are derived from fatty acids. Examples of the alkyl group are decyl, dodecyl, myristyl, and hexadecyl. Mixed long chain alkyls derived from coconut oil fatty acids and tallow fatty acids can also be used along with cracked paraffin wax olefins and polymers of lower monoolefins. The alkyl groups mentioned above can be saturated or unsaturated.

Particularly advantageous anionics are the olefin sulfonates. Typically, they contain long-chain alkenyl sulfonates and are produced by the sulfonation of monoolefins, using sulfur trioxide ($SO_3$) as the sulfonating agent. Thus, $SO_3$ is reacted with olefins of the formula $R_1CH=CHR$, wherein R is an alkyl radical and $R_1$ is alkyl or hydrogen, preferably hydrogen, by bringing a stream of $SO_3$, highly diluted with an inert gas such as air, into contact with the olefin, preferably an alpha-olefin, to produce a viscous acidic product which contains alkene sulfonic acids and sultones. On hydrolysis and neutralization, as by treatment with strong aqueous alkali, sultones in the product are converted to the corresponding hydroxy-alkane sulfonates, giving an olefin sulfonate product containing long chain alkenyl sulfonic acids and long chain hydroxyalkane sulfonic acids, together with water-insoluble inactive long chain compounds such as sultones. To produce a higher yield of the preferred olefin sulfonates, the $SO_3$-olefin reaction product can be treated with strong sulfuric acid under non-hydrolyzing conditions prior to neutralization. After neutralization, the product of the treatment, which is preferably employed in the practice of the present invention, has an increased proportion of alkenyl sulfonate; a larger portion of the latter has its olefinic double bond in the 3,4 position. The olefin sulfonate detergents also can contain minor quantities of disulfonates, presumably produced in the course of sulfonation treatment by reaction of excess $SO_3$ with the alkenyl sulfonate formed during sulfonation, and sulfate sulfonates. The alpha-olefin feedstock to be sulfonated preferably contains olefins of eight to 25 carbon atoms, most preferably 12-21 carbon atoms. The feedstock may contain minor amounts of other constituents such as secondary or internal olefins, diolefins, cyclic olefins, aromatics, naphthenes and alkanes, and may be produced by cracking of petroleum wax, catalytic polymerization of ethylene, dehydration of long-chain alcohols, etc. Best results have thus far been obtained when alpha-olefins (where $R_1$ is H) constitute a major proportion, for example, above 70 percent and preferably at least 90 percent of the feedstock. A particularly preferred olefin feedstock contains in the range of about 12 to 21 carbon atoms in the molecule and yields olefin sulfonates having excellent detergency properties. Especially good characteristics have been obtained by the use of a feedstock whose alpha-olefin content consists essentially of compounds of 15 to 18 carbon atoms.

Though mixtures of olefin sulfonates are generally used because current processes make them more practical, individual olefin sulfonates can also be used effectively. Examples are $C_{14}$ alpha-olefin sulfonate, $C_{16}$ alpha-olefin sulfonate, and $C_{18}$ alpha-olefin sulfonate.

Examples of other anionic aliphatic detergents are the sulfuric acid esters of polyhydric alcohols incompletely esterified with higher fatty acids, either saturated or unsaturated, particularly those whose acyl groups contain from 12 to 18 carbon atoms, e.g., coconut oil monoglyceride monosulfate, hydrogenated coconut oil monoglyceride monosulfate, tallow monoglyceride monosulfate; the long chain pure or mixed higher alkyl sulfates of 12–18 carbons, e.g., lauryl sulfate, cetyl sulfate, higher fatty alcohol sulfates derived from hydrogenated or non-hydrogenated coconut oil or tallow fatty acids; the higher fatty acid esters of hydroxy alkyl sulfonic acids, e.g., higher fatty acid esters of 2,3 dihydroxy propane sulfonic acid; higher fatty acid amides of amino alkyl sulfonic acids, e.g., the oleic acid amide of amino methyl sulfonic acid, and the lauric acid amide of taurine. Other aliphatic long chain sulf(on)ates can be used including fatty sulfoacetates, e.g., coconut fatty alcohol sulfoacetates; sulfated fatty acyl monoethanolamides, e.g., sulfated lauroyl monoethanolamide; fatty sulfoacetamides, e.g., lauryl sulfoacetamide; lower alkyl sulfosuccinates, e.g., dioctyl sulfo-succinate; solf(on)ated fatty oils such as sulf(on)ated red oil, and lower alkyl esters of alpha-sulfonated higher fatty acids, e.g., methyl ester of alpha-sulfo myristic acid, sodium salt. Synthetic detergents having a carboxylate group and, particularly, the higher fatty acid amides of aliphatic long chain amino acid compounds can also be used such as the higher fatty acyl sarcosinates having about 10 to 18 carbons, usually 12–14 carbons, in the acyl radical, preferably the water-soluble salts of N-lauroyl or N-cocoyl sarcosine. Other materials are the higher fatty acid amides of polypeptide amino acids obtained by protein hydrolysis. Suitable ether-containing sulfates which can be used are the alkylphenol polyglycol ether sulfates, e.g., lauryl phenol polyethyleneoxy sulfates, and alkyl polyglycol ether sulfates, e.g., lauryl ethyleneoxy sulfates, each containing about 10 to 18 carbons in said alkyl groups and about 2 to 10 moles of ethylene oxide, usually 3–4 moles, per molecule. Soaps can also be used. These various anionic detergents are used in the form of their water soluble or water dispersible salts such as the amine, alkali metal and alkaline earth metal salts. Examples are the sodium, potassium, magnesium salts, ammonium, monoethanolamine, diethanolamine, triethanolamine salts, and mixtures thereof.

As the nonionic detergent, any of the conventional water-soluble nonionic detergents can be used in the composition of this invention. These nonionics can be in liquid to solid form. Generally, such nonionics have a hydrophobic group containing at least eight carbon atoms and preferably 8 to 30 carbon atoms. One particular class of such detergents is that formed by the oxyalkylation of fatty acids, alcohols, phenols, mercaptans, thiophenols, amines, and amides with ethylene oxide, propylene oxide, and other related alkylene oxides. Such materials usually have at least 5 mols of alkylene oxide, and preferably 5 to 30 mols of alkylene oxide, depending upon the particular hydrophilic group desired. Representative of these materials are those formed by the condensation of ethylene oxide with alkyl phenols or alcohols. Particularly preferred herein are condensates formed by the reaction of one mol of nonyl phenol or a mixture of $C_{12}$–$C_{18}$ saturated, straight-chain, aliphatic alcohols with 8 to 12 mols of ethylene oxide, the condensates containing an average of about 8 to 10 ethylene oxide groups per molecule. Some specific examples of this type of nonionic detergent are as follows: nonyl phenolethylene oxide condensates having an average of 9.5 ethylene oxide groups per molecule; a mixture of saturated aliphatic alcohols having from 14 carbons to 18 carbons in their chains and an average of 8.5 mols of ethylene oxide per molecule; tallow alcohol-ethylene oxide condensate having an average of 9 mols of ethylene oxide per molecule; and a 1:1 mixture of a $C_{12}$ and a $C_{14}$ saturated aliphatic alcohol having an average of 8.5 mols of ethylene oxide per molecule. Other alkylphenol condensates are those of diamylphenol, p-tert-octylphenol, 2,4-dicyclohexylphenol, m-pentadecylphenol, and benzyl-o-hydroxybiphenyl. Other condensates with alkylene oxide are those of tall oil, branched chain $C_{14}$ to $C_{17}$ aliphatic alcohols, lanolin, beeswax, bis-phenols, oxidized paraffin wax, naphthenic acids, and fatty acyl alkanolamides. Other nonionics are the alkylolamine condensates of higher fatty acids such as lauric and myristic diethanolamide and coconut fatty acid diethanolamide and the higher alkyl amine oxides such as lauryl dimethyl amine oxide. In place of the lauryl radical of the amine oxide compound, other long chain alkyl radicals, preferably having 10 to 18 carbon atoms, can be used. In place of either or both methyl radicals, there can be other lower alkyl or hydroxy-alkyl radicals, for example, having two carbons each. Suitable examples include a mixture of higher alkyl dimethyl amine oxides having essentially about 12 to 14 carbons in the higher alkyl groups. Mixtures of various water soluble nonionic detergents are contemplated.

The glycol ethers which can be used are water soluble and have a boiling point above 100°C. Examples are ethylene glycol monomethyl ether; ethylene glycol monoethyl ether; ethylene glycol monobutyl ether; diethylene glycol monomethyl ether; diethylene glycol monoethyl ether; diethylene glycol monobutyl ether; propylene glycol methyl ether; propylene glycol propyl ether, dipropylene glycol methyl ether; ethylene glycol phenyl ether; and 1-butoxyethoxy-2-propanol. The boiling points of the glycol ethers preferably range between 100°C. and 300°C; the molecular weight between 70 and 300; and the number of carbon atoms from 3 to 12. Mixtures of the glycol ethers can also be used if desired.

Any of the conventional forms of alkali metal or ammonium borates and mixtures thereof can be used. Borax is preferred and can be included in the anhydrous form, as the pentahydrate, or as the decahydrate. The parts by weight of borate are determined herein, however, on the basis of the anhydrous form. Both the potassium and ammonium borates provide commercially practical substitutes for borax.

The nitrilo compound can be nitrilotriacetic acid, alkali metal nitrilotriacetate, or ammonium nitrilotriacetate. The alkali metal cation is generally sodium or potassium and preferably sodium. Sodium nitrilotriacetate is available in three forms: trisodium nitrilotriacetate which is commonly used; disodium nitrilotri-acetate; and the anhydrous form. It is believed that the "disodium" form is converted to the "trisodium" form by adjustment of the pH to at least 8.5 and that the anhydrous form takes on the "trisodium" form in an aqueous medium.

As noted previously, the composition of this invention is aqueous. The water content may range from about 70 to 90 percent by weight of the entire composition and preferably from about 80 to 95 percent. It is clear that more concentrated forms may be prepared.

Hydrotropes and other additives can be used in the composition of this invention although they are not essential. A hydrotrope is preferred, however, since it assists the composition in achieving the stability and homogeneity which is so desirable in commercial formulations. The salts of aryl sulfonates such as the alkali metal aryl sulfonates can be used. Examples are sodium cumene sulfonate, sodium xylene sulfonate, and sodium toluene sulfonate. The potassium and ammonium ions can be substituted for the sodium ion and mixtures of hydrotropes can be used. Other additives can include ammonia, sodium or potassium hydroxide for pH adjustment, perfume, colorants, opacifiers such as modified polystyrene emulsions; foam stabilizers such as the mono- and dialkanolamides, e.g., lauric myristic diethanolamide; a foam control additive such as soap prepared from coconut or tallow fatty acids; and an antioxidant such as sodium sulfite. The amount of hydrotrope used can be up to about 10 percent by weight of the total composition and is preferably from about 0.5 percent to about 5 percent by weight. The total amount of other additives present can also be up to about 10 percent by weight and preferably no more than about 5 percent. In special situations, it may be appropriate to use the hydrotropes and other additives in amounts up to 20 percent by weight; however, this is purely a matter of choice and objective.

The pH of the aqueous composition of this invention can range from 8.5 to 12.5 and is preferably from 10 to 11.

The types of synthetic surfaces suggested herein as surfaces from which polish can be stripped by the composition of this invention are linoleum, vinyl, vinyl-asbestos, asphalt, and rubber, generally in sheet or tile form.

The types of floor waxes which can be stripped from synthetic surfaces are generally described above as containing insoluble polymers, alkali soluble resins, and soft waxes. More specifically, polyethylenes, polystyrenes, and polyacrylates and their copolymers provide the bases for the floor polishes in general current use. To these bases which are emulsified are added natural and synthetic waxes and alkali soluble resins. The natural waxes are exemplified by carnauba, stearone, spermaceti, ouricurry, and cane wax. The synthetic waxes are exemplified by the paraffin and microcrystalline waxes. The alkali soluble resins are exemplified by shellac and rosin, styrene-maleic acid copolymers, acrylic resins, terpene-phenolic and phthallic-maleic copolymers.

The composition of this invention is, in addition to stripping wax from floors, useful for cleaning a variety of surfaces, painted or unpainted such as those made of plaster, metals, tile, wood, plastics, ceramics, etc. It is effective in removing soils such as grease, pencil marks, scuff and heel marks, and tar and oil and is, in many cases, used in sprayable form.

The invention is further illustrated by the following examples in which percentages are by weight.

EXAMPLE I

The performance of the following formulation is determined by a visual estimate of the percent of wax film removed from a vinyl floor tile using a carbon soil as an indicator. To prepare the tile, a floor polish is blended with activated charcoal and this is applied by standard techniques to a white vinyl tile which is then aged for one week at room temperature. Wax stripping is accomplished using a Gardner straight line abrader loaded with a saturated mohair strip (excess drained). Comparative wax-stripping tests are performed on a single tile. Percentage removal is noted at a point where one of the tested formulations substantially strips the tile. Each formulation is adjusted to a pH of 10.6 ± 0.2 for use in the wax stripping test.

Two commercial polishes are used: Klear, an acrylic based polish and Glo-Coat, a styrene based polish. Each contains an insoluble polymer, an alkali soluble resin, and a soft wax. Examples of acrylic and styrene based polishes can be found in U.S. Pat. No. 3,156,661.

The formulations are prepared by simple admixture with conventional agitation and are set forth in Table I (values represent percentages; water is added to make a 100 percent solution).

TABLE I

|  | A | C | E | L | M |
|---|---|---|---|---|---|
| 1) LDBS | 0.5 | 0.5 | 0.5 |  | 0.5 |
| 2) NTA | 4 |  | 2 | 2 | 2 |
| 3) borax |  | 4 | 2 | 2 | 2 |
| 4) ethylene glycol monobutyl ether | 5 | 5 | 5 | 5 |  |
| 5) Na xylene sulfonate | 1 | 1 | 1 | 1 | 1 |
| 6) water | q.s | q.s | q.s | q.s | q.s |

NTA = trisodium nitrilotriacetate
LDBS = Linear dodecyl benzene sulfonate
borax: the percent set forth represents the amount of anhydrous borax. Borax pentahydrate is actually used.

Pairs of formulations are applied to each tile, one of the pair being applied to one half of the tile and the other to the other half of the tile. Each pair is tested twice, once on a tile covered with soiled Klear and once on a tile covered with soiled Glo-Coat. The paired combinations are as follows: A-E, C-E, L-E, M-E. It is observed that with respect to the percent of wax film removed E substantially outperforms A, C, L and M.

EXAMPLE II

Example I is repeated except that the concentration of components 1 to 6 inclusive in Table I is increased 2½ times, water again making up the balance of 100 percent.

Before application to tiles, these concentrated solutions are diluted with water to 1.5 percent (i.e., 1.5 parts concentrate to 98.5 parts H$_2$O on a volume basis).

Results similar to those in Example I are obtained.

EXAMPLE III

Example I is repeated except that the formulations in Table II are used.

The paired combinations are as follows: E-N and E-P. It is observed that with respect to the percent of wax film removed E substantially outperforms N and P.

TABLE II

|  | E | N | P |
|---|---|---|---|
| 1) LDBS | 0.5 | 0.5 | 0.5 |
| 2) NTA | 2 |  | 4.5 |
| 3) borax | 2 |  | 4.5 |
| 4) ethylene glycol monobutyl ether | 5 | 9 |  |
| 5) Na xylene sulfonate | 1 | 1 | 1 |
| 6) water | q.s | q.s | q.s |

EXAMPLE IV

Example I is repeated except that sodium dodecyl oxydibenzene sulfonate is substituted for LDBS. The results are substantially the same.

EXAMPLE V

Example I is repeated except that the following olefin sulfonate is substituted for LDBS: an olefin sulfonate having 98.4 percent solids, 82.7 percent anionically active ingredient, 2.6 percent free oil and 1.5 percent water, produced by sulfonation of a C15–C18 alpha olefin cut and hydrolysis and neutralization of the product to produce the sodium salt. The C15–C18 cut contains about 98 percent olefins, 89 percent straight chain alpha-olefins, 2 percent diolefins, 2 percent paraffins, with a carbon number distribution of 1 percent C14, 27% C15, 29% C16, 28 percent C17, 14% C18 and 1% C19.

EXAMPLE VI

Example I is repeated substituting dipropylene glycol methyl ether for the ethylene glycol monobutyl ether. The results are substantially the same.

EXAMPLE VII

Example I is repeated substituting the potassium ion for the sodium ion in the borate. The results are substantially the same.

EXAMPLE VIII

Example I is repeated with respect to the formulations concerning borax and the comparison testing thereof (A, C, E, L and M) except that KOH and boric acid are substituted for the borax in such amounts to provide a like percentage of potassium tetraborate in situ. The results are substantially the same.

EXAMPLE IX

Composition E of Example I is employed as a "spot" remover (as is) to remove common soils from a painted panel. The soils are pencil marks, rubber heel marks, crayon, oil Dag (coclordal graphite-mineral oil). Excellent removal of each of the aforementioned stains is noted.

Although the present invention has been described with reference to particular embodiments and examples, it will be apparent to those skilled in the art that variations and modifications can be substituted therefor without departing from the principles and true spirit of the invention. The "Abstract" given above is for the convenience of technical searchers and is not to be used for interpreting the scope of the invention or claims.

What is claimed is:

1. A cleaning composition adapted for spot cleaning and wax stripping which forms a single phase in water consisting essentially of about 0.3 to about 1 part by weight of a water soluble detergent selected from the group consisting of a linear dodecyl benzene sulfonate and a mixed C15-18 olefin sulfonate; about three to about seven parts by weight of a water soluble glycol ether selected from the group consisting of ethylene glycol mono butyl ether and dipropylene glycol methyl ether; and about two to eight parts by weight of a 1:1 weight mixture of a nitrilo compound selected from the group consisting of nitrilo triacetic acid, and alkali metal and ammonium nitrilotriacetates and a borate selected from the group consisting of alkali metal and ammonium borates.

2. A cleaning composition as defined in claim 1 adapted for spot cleaning and wax stripping which forms a single phase in water consisting essentially of 0.5 parts by weight of a linear dodecyl benzene sulfonate; 5 parts by weight of ethylene glycol monobutyl ether; two parts by weight of a trisodium nitrilotriacetate; and two parts by weight of borax, said composition having a pH of not less than 8.5 in aqueous solution.

* * * * *